United States Patent
Shiue

(10) Patent No.: US 12,214,262 B2
(45) Date of Patent: Feb. 4, 2025

(54) LENS ASSEMBLY STRUCTURE OF SWIMMING GOGGLES

(71) Applicant: QBAS Co., Ltd., Taipei (TW)

(72) Inventor: Chih-Cheng Shiue, Taipei (TW)

(73) Assignee: QBAS CO., LTD., Taipei (TW)

( * ) Notice: Subject to any disclaimer, the term of this patent is extended or adjusted under 35 U.S.C. 154(b) by 359 days.

(21) Appl. No.: 17/349,108

(22) Filed: Jun. 16, 2021

(65) Prior Publication Data

US 2022/0176203 A1     Jun. 9, 2022

(30) Foreign Application Priority Data

Dec. 4, 2020  (TW) ................................. 109216086

(51) Int. Cl.
    *A63B 33/00*      (2006.01)
    *G02C 7/02*      (2006.01)
    *G02C 11/08*      (2006.01)

(52) U.S. Cl.
    CPC .............. *A63B 33/004* (2020.08); *G02C 7/02* (2013.01); *G02C 11/08* (2013.01)

(58) Field of Classification Search
    CPC ... A63B 33/004; A63B 33/002; A63B 33/006; A63B 33/008; B63C 11/12; A61F 9/026; A61F 9/027
    See application file for complete search history.

(56) References Cited

U.S. PATENT DOCUMENTS

| | | | | |
|---|---|---|---|---|
| 5,890,237 A | * | 4/1999 | Herman | A63B 33/004 |
| | | | | 2/440 |
| 5,950,248 A | * | 9/1999 | Kawashima | A63B 33/004 |
| | | | | 2/443 |
| 6,092,243 A | * | 7/2000 | Wu | A61F 9/025 |
| | | | | 2/440 |
| 2004/0088779 A1 | * | 5/2004 | Kita | A61F 9/025 |
| | | | | 2/443 |
| 2017/0203159 A1 | * | 7/2017 | Schuwerk | A63B 33/004 |

FOREIGN PATENT DOCUMENTS

| | | | |
|---|---|---|---|
| KR | 19980063977 U | * 11/1998 | |
| KR | 20030065988 A | * 8/2003 | A63B 33/00 |

OTHER PUBLICATIONS

Translation of KR19980063977U (Year: 1998).*
Translation of KR-20030065988-A (Year: 2003).*

* cited by examiner

*Primary Examiner* — Katherine M Moran
*Assistant Examiner* — Grady Alexander Nunnery
(74) *Attorney, Agent, or Firm* — Muncy, Geissler, Olds & Lowe, P.C.

(57) ABSTRACT

The present invention provides a lens assembly structure of swimming goggles. The lens assembly structure comprises two lenses, two retaining walls, two skirt portions, and two frame portions. Each of the lenses includes an eye side and a water side opposing to the eye side. The two retaining walls are provided on the eye sides of the lenses, respectively, and each of the retaining walls defines a visible area and a connection area. Each of the retaining walls has a configuration, and the corresponding skirt portion is disposed along the configuration. The connection area of the lens is affixed in the corresponding frame portion. The configuration of each of the retaining walls is a curve having a contour which is less complicated than a peripheral configuration of the lens.

14 Claims, 5 Drawing Sheets

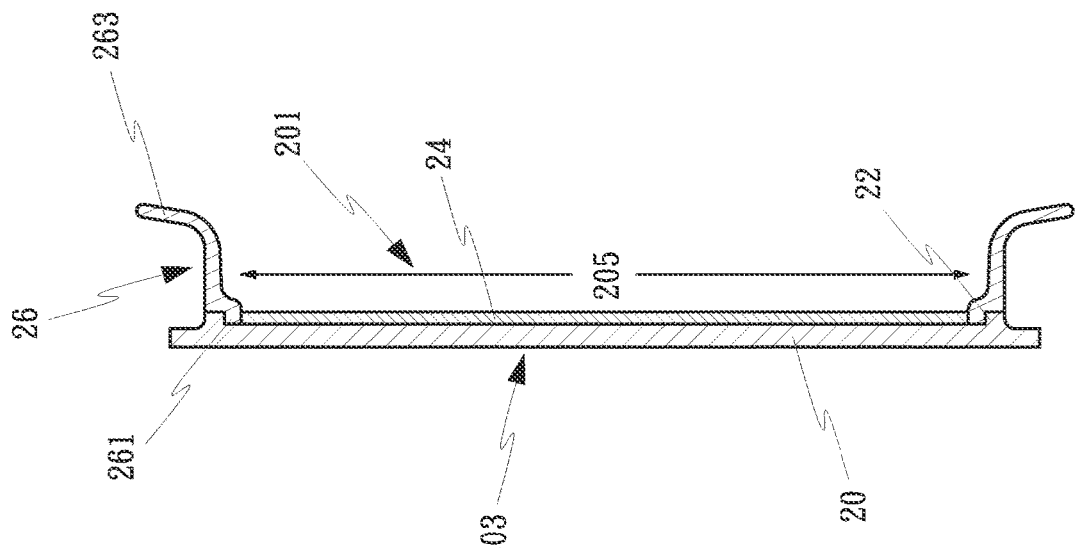
FIG. 5A
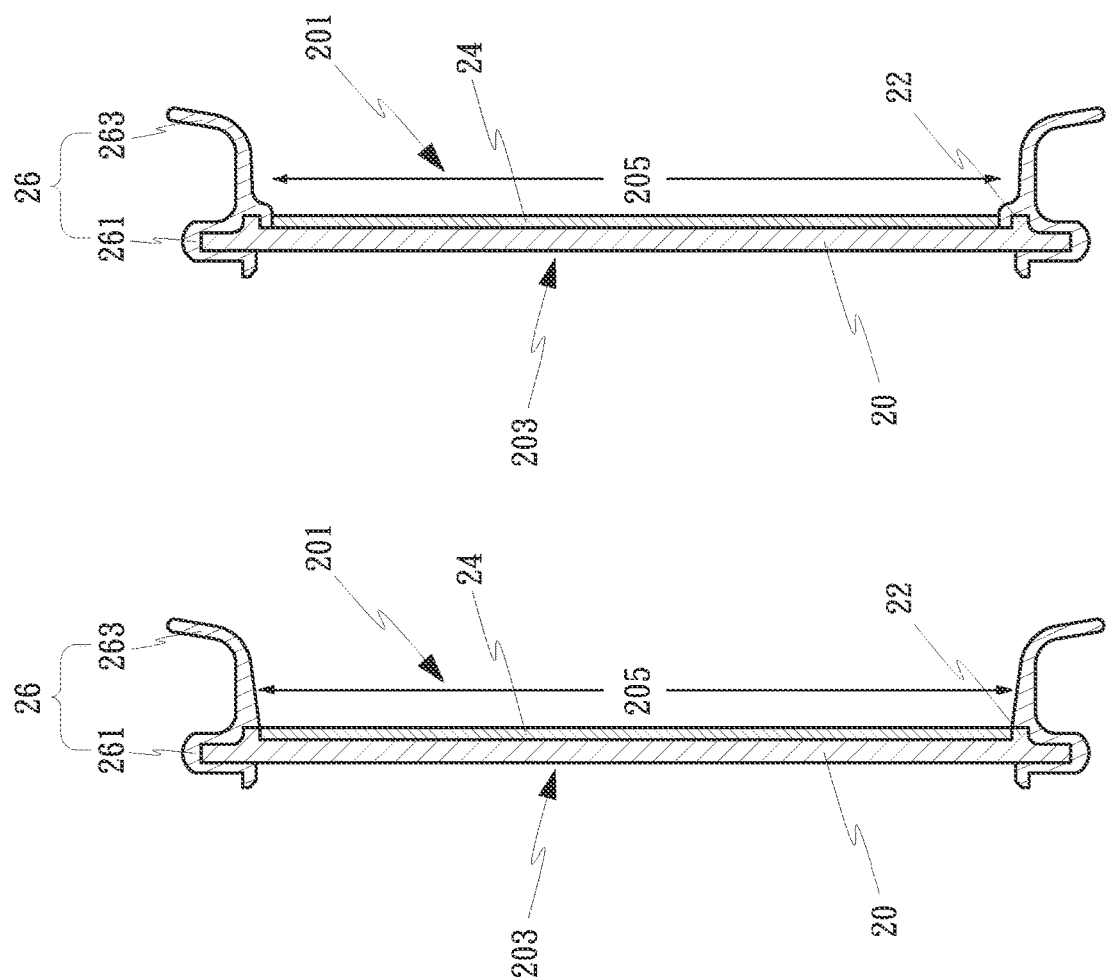
FIG. 5B
FIG. 5C

LENS ASSEMBLY STRUCTURE OF SWIMMING GOGGLES

CROSS-REFERENCES TO RELATED APPLICATIONS

This application claims the benefit of the Taiwan Patent Application Serial Number 109216086 filed on Dec. 4, 2020, the subject matter of which is incorporated herein by reference.

BACKGROUND OF THE INVENTION

Field of the Invention

The present invention relates to a lens assembly structure of a kind of swimming goggles, and in particular, the present invention relates to a lens assembly structure which can adopt lenses with various configurations and is still capable of keeping the shape of the mask smooth and simple.

Descriptions of the Related Art

When people are engaged in snorkeling, diving, swimming, or other water and underwater sports, they often wear frog goggles, diving goggles, or swimming goggles to prevent their eyes from coming into direct contact with water. In order to meet different use requirements and styles of design, various lines and shapes are gradually derived from such products, thereby meeting the required hydrodynamics and special fashion design shapes, hoping to improve the appearance of products.

In these products with special designs, because lenses with complicated shapes, such as lenses with many twists on the periphery and lenses with irregular configuration, are used, when an eye mask is set along the periphery of the lens, it is difficult for the eye mask to closely wrap and combine with the periphery of the complicated lens. Therefore, the time and difficulty of the manufacturing process are much higher, and it may be impossible to make eye masks with complicated shapes. When it is necessary to use lenses with design of a larger size, the manufacturing difficulty will be higher.

On the other hand, when a user wears this kind of swimming goggles, fogging often occurs to the inner side of the lenses of the swimming goggles because of the higher face temperature and moisture. Therefore, before the swimming goggles leave the factory, the factory hopes to apply a layer of anti-fog agent to the inner side of the lenses so that, when the buyer buys the swimming goggles for use for the first time, the buyer can use the swimming goggles directly without coating the anti-fog agent to the lenses by themselves as no fogging occurs, and the anti-fog effect can be maintained for a period of time, which also enhances the consumer's trust in the products. However, the above-mentioned lenses with complicated shapes often have problems that the coating range is difficult to define and the coating operation is difficult, and the lenses with larger sizes will have the problem of wasting the anti-fog agent because the coating range is too large.

Accordingly, an urgent need exists in the art to provide a structure which can improve the trouble of manufacturing and assembling lenses with special shapes and/or large sizes, save the amount of anti-fog agent used in the process and increase the convenience of the coating operation.

SUMMARY OF THE INVENTION

As a matter of fact, the distance between lenses of any frog goggles, diving goggles, or swimming goggles and eyes of users will not be too large, so the visual field of the eyes looking out through the lenses does not need to occupy the whole range of the lenses. That is, there will be a physical visible area in the lenses, which is enough to provide the user with sufficient and effective visual field, and this visible area becomes the source of making the present invention.

The primary objective of the present invention is to provide a lens assembly structure of swimming goggles, which is suitable for lenses with various configurations. No matter the lenses have appearance larger than that of normal swimming goggles or have many twists on the periphery, the eye masks with the required appearance can be installed with a simple process and shorter working hours.

The secondary objective of the present invention is also to provide a lens assembly structure of swimming goggles, which can coat the anti-fog agent within an appropriate range required by the lens, that is, a range close to the aforesaid visible area, when the anti-fog agent is applied to the inner side of the lens, which not only improves the coating efficiency, but also avoids the waste of the anti-fog agent.

In order to achieve the above objectives, the lens assembly structure of swimming goggles provided by the present invention comprises two lenses, two skirt portions, and two frame portions, wherein each of the skirt portions and the corresponding frame portion may be combined with each other or may also be integrally formed. Each of the lenses has an eye side and a water side, and a retaining wall protrudes from and is provided on the eye side so as to define a visible area and a connection area for the lens. The retaining wall has a configuration of simple curves, such as egg-shaped or elliptical configurations. Each of the skirt portions is disposed on the corresponding retaining wall in the form of partially wrapping or completely wrapping the retaining wall along the configuration of the retaining wall, and each of the skirt portions may be disposed in the form of completely wrapping, partially wrapping or not wrapping the connection area of the lens. The connection area of the lens is assembled and fixed in the corresponding frame portion, or integrally over-molded with the corresponding frame portion.

In the present invention, by setting the retaining wall, the skirt portion can be set along the retaining wall with an appropriate size and a simple configuration. In this way, the construction of the eye mask can follow the retaining wall, without following the configuration of the lens with complicated shapes. For eye masks with various shapes, the manufacturing and assembling efficiency can be effectively controlled, and thus the saved time and cost can be used for research and development in other aspects. In addition, by setting the retaining wall, a proper and reasonable coating area of anti-fog agent can be defined, and the waste of anti-fog agent can also be avoided.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 5A is a schematic cross-sectional view showing a first relative relationship among a lens, a retaining wall, a skirt portion, and an anti-fog layer;

FIG. 5B is a schematic cross-sectional view showing a second relative relationship among a lens, a retaining wall, a skirt portion, and an anti-fog layer;

FIG. 5C is a schematic cross-sectional view showing a third relative relationship among a lens, a retaining wall, a skirt portion, and an anti-fog layer.

DESCRIPTION OF THE PREFERRED EMBODIMENT

Figure 1:
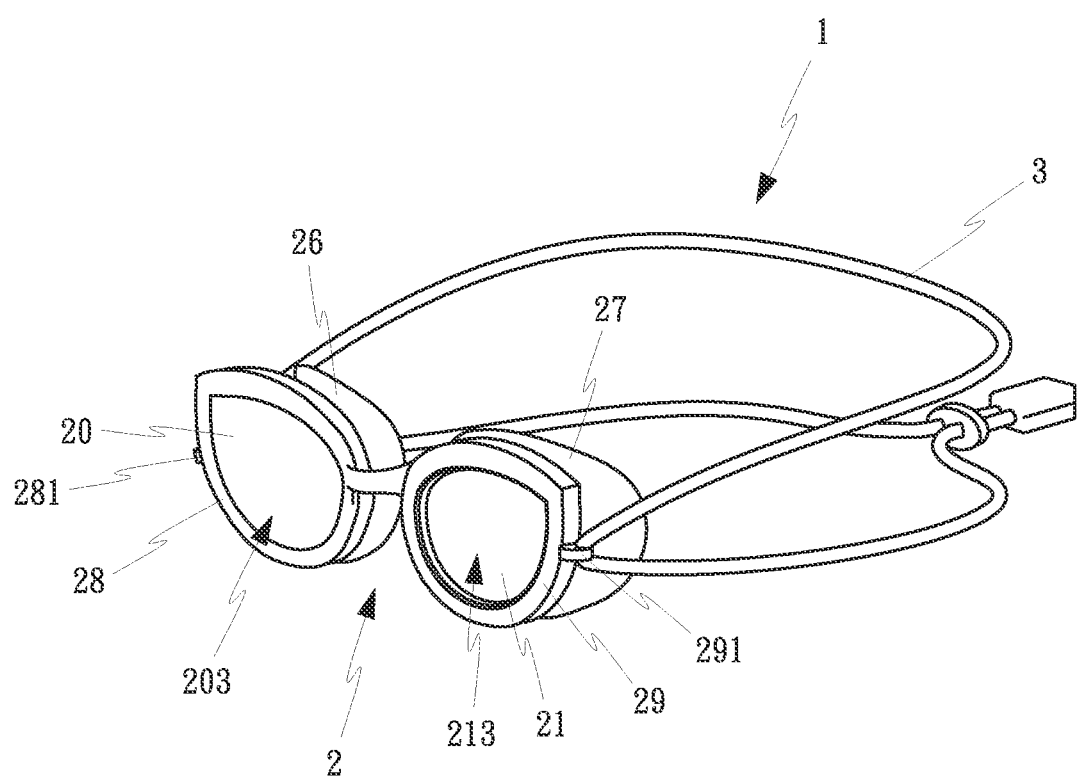
FIG. 1 is a schematic perspective view of a lens assembly structure assembled in swimming goggles according to the present invention.
Figure 2:
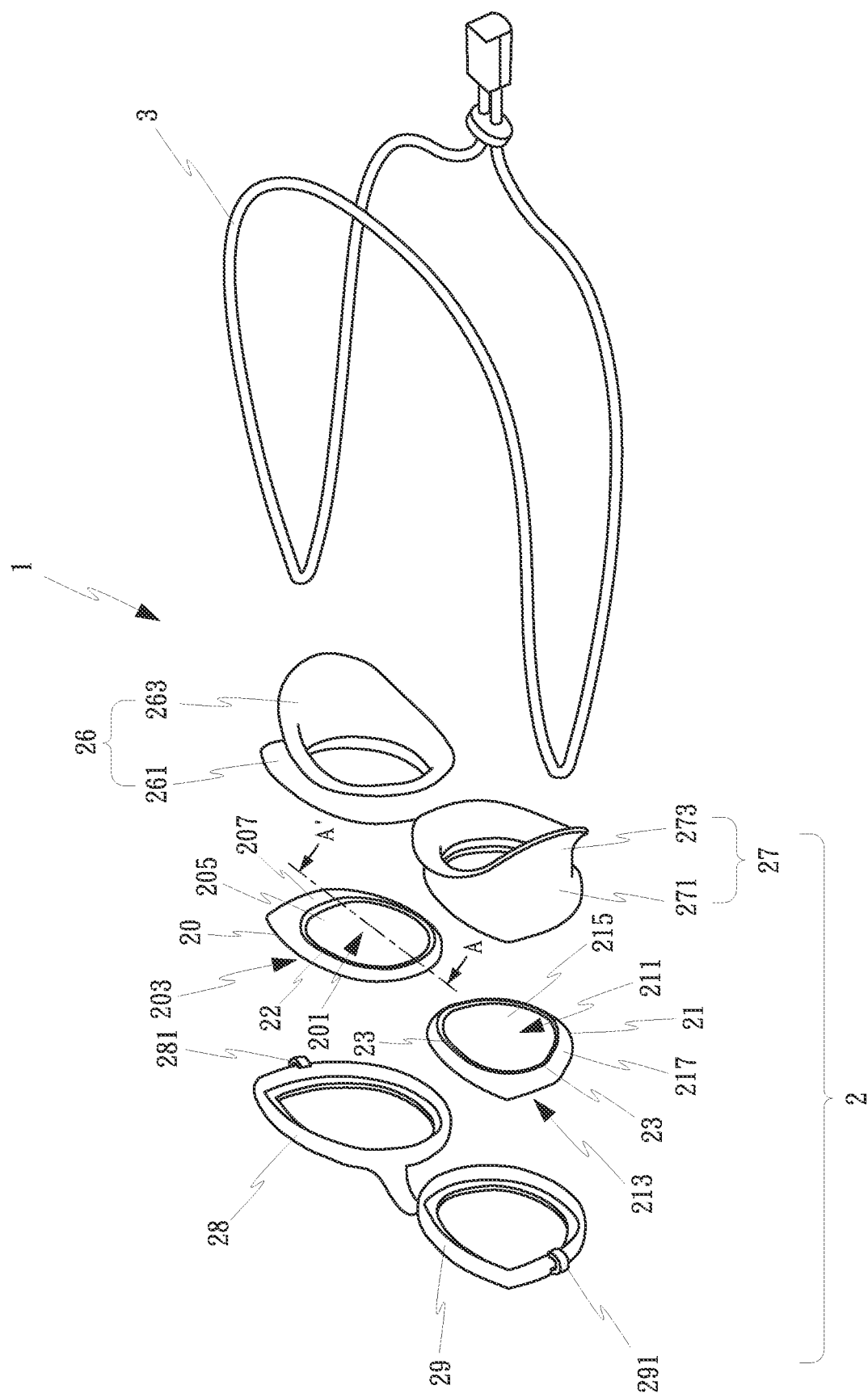
FIG. 2 is a perspective exploded view of FIG. 1.
Figure 3:
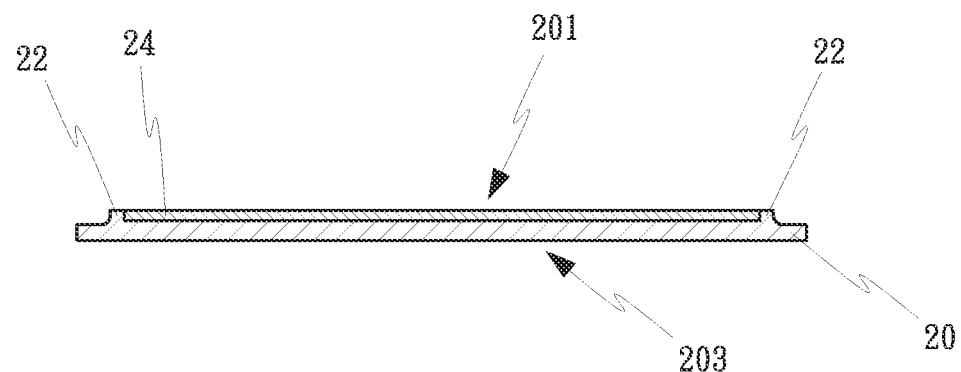
FIG. 3 is a schematic cross-sectional view taken along a line A-A' of FIG. 2, which shows relative relationships among a first lens, a first retaining wall, and a first anti-fog layer.
Figure 4:
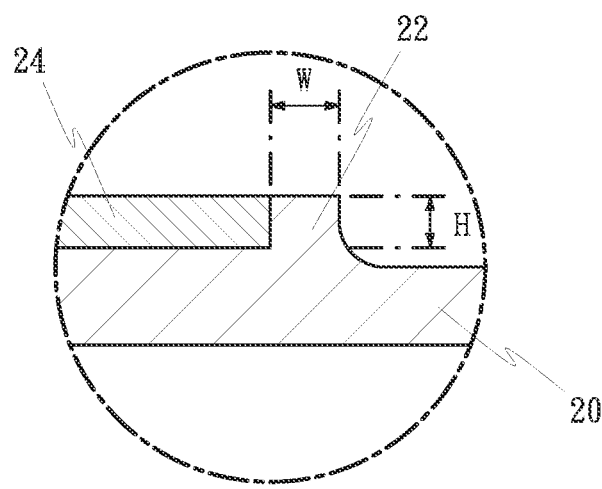
FIG. 4 is a partially enlarged view of FIG. 3.

FIG. 1, FIG. 2, and FIG. 3 are a schematic perspective view, a perspective exploded view, and a schematic partial cross-sectional view of a lens assembly structure 2 assembled in swimming goggles 1 according to the present invention, respectively. The swimming goggles 1 of this embodiment are adapted to be worn on the face of a user and have the lens assembly structure 2 and an elastic band 3.

In this embodiment, the lens assembly structure 2 of the swimming goggles 1 comprises a first lens 20, a second lens 21, a first retaining wall 22, a second retaining wall 23, a first anti-fog layer 24, a second anti-fog layer (not shown), a first skirt portion 26, a second skirt portion 27, a first frame portion 28 and a second frame portion 29.

In reference to FIG. 2, the first lens 20 has a first eye side 201 and a first water side 203. The second lens 21 has a second eye side 211 and a second water side 213. When the user wears the swimming goggles 1, the first eye side 201 of the first lens 20 and the second eye side 211 of the second lens 21 are adjacent to the face of the user and correspond to the right and left eyes of the user, respectively. The first water side 203 of the first lens 20 and the second water side 213 of the second lens 21 are far away from the user's face, and when used in water, the first water side 203 and the second water side 213 are in direct contact with water.

The first retaining wall 22 protrudes from and is disposed on the first eye side 201 of the first lens 20 and defines a first visible area 205 and a first connection area 207 on the first lens 20. The first connection area 207 is located on the periphery of the first visible area 205. The second retaining wall 23 protrudes from and is disposed on the second eye side 211 of the second lens 21 and defines a second visible area 215 and a second connection area 217 on the second lens 21. The second connection area 217 is located on the periphery of the second visible area 215. The first retaining wall 22 has a first configuration, the second retaining wall 23 has a second configuration. Both of the first configuration and the second configuration are continuous closed curves and have contours that are less complicated than the peripheral configurations of the first lens 20 and the second lens 21, respectively. Further speaking, the less complicated curve represents that the curvature change of the contour of the retaining wall is gentler than that of the peripheral configuration of the lenses, i.e., the example as shown in FIG. 2. For another example, the peripheral configurations of the first lens 20 and the second lens 21 are squares with chamfers or rounded corners, or some parts thereof have irregular wavy contours, while the first configuration of the first retaining wall 22 and the second configuration of the second retaining wall 23 may be (but not limited to) simple curves without much bending or strong curvature changes, such as egg-shaped, elliptic, and circular curves. In contrast, the peripheral configurations of the first lens 20 and the second lens 21 may be designed according to product requirements to have much bending or to present irregular periphery so that the shapes of the first connection area 207 and the second connection area 217 are not limited. It shall be additionally appreciated that, the peripheral configurations of the first lens 20 and the second lens 21 are not necessarily the same, and the first configuration of the first retaining wall 22 and the second configuration of the second retaining wall 23 are also not necessarily the same.

In this embodiment, the first retaining wall 22 and the first lens 20 are integrally formed by injection molding, and the second retaining wall 23 and the second lens 21 are integrally formed by injection molding. However, in other embodiments, the first retaining wall 22, the first lens 20, the second retaining wall 23 and the second lens 21 may also be formed separately, and then the first retaining wall 22 and the second retaining wall 23 protrude from and are provided respectively on the first eye side 201 of the first lens 20 and the second eye side 211 of the second lens 21 by glue or ultrasonic welding, and the first retaining wall 22 and the second retaining wall 23 are not necessarily the same. In addition, preferably, the height H of the first retaining wall 22 and the second retaining wall 23 is 0.1 to 5 millimeters (mm), and the width W of the first retaining wall 22 and the second retaining wall 23 is 0.3 to 5 mm.

In reference to FIG. 1, FIG. 2, and FIG. 3 at the same time, FIG. 3 is a schematic cross-sectional view taken along the line A-A' of FIG. 2 to illustrate the first lens 20, the first retaining wall 22, and the first anti-fog layer 24 of this embodiment. As shown in the figures, the first anti-fog layer 24 is coated on the eye side 201 of the lens and is located on the first visible area 205 defined by the first retaining wall 22 on the first lens 20. Although most of the current technologies coat the anti-fog agent on the lens to form the anti-fog layer on the lens, the ways in which the anti-fog layer is formed and disposed are not limited in the present invention. In this embodiment, the cross-sectional structures of the second lens 21, the second retaining wall 23, and the second anti-fog layer (not shown) are the same, and thus will not be further described herein.

FIG. 5A is a schematic cross-sectional view showing a first relative relationship among the first lens 20, the first retaining wall 22, the first anti-fog layer 24, and the first skirt portion 26. The second lens 21, the second retaining wall 23, the second anti-fog layer and the second skirt portion 27 of this embodiment also have the same structures, and thus will not be further depicted herein. In detail, the first skirt portion 26 is arranged on the first retaining wall 22 along the first configuration of the first retaining wall 22, while the second skirt portion 27 is arranged on the second retaining wall 23 along the second configuration of the second retaining wall 23. The first skirt portion 26 of this embodiment has a first wrapping part 261 and a first fitting part 263. The first wrapping part 261 completely wraps the first connection area 207 of the first lens 20 and partially wraps the first retaining wall 22 (including the outer side and the upper edge of the first retaining wall 22) and encloses the first visible area 205. The second skirt portion 27 has a second wrapping part 271 and a second fitting part 273. The second wrapping part 271 completely wraps the second connection area 217 of the second lens 21 and partially wraps the second retaining wall 23 (including the outer side and the upper edge of the second retaining wall 23) and encloses the second visible area 215. The first fitting part 263 and the second fitting part 273 are adapted to tightly fit the face of the user when worn by the user. Since the first retaining wall 22 and the second retaining wall 23 define the first connection area 207 and the second connection area 217 on the first lens 20 and the second lens 21 respectively, no matter how complicated the peripheral configurations of the first lens 20 and the second lens 21 are or how large the sizes of the first lens 20 and the second lens 21 are, the first wrapping part 261 of the first skirt portion 26 and the second wrapping part 271 of the second skirt portion 27 can be based on the configurations of the first retaining wall 22 and the second retaining wall 23, and the first fitting part 263 and the second fitting part 273 with proper size and smooth appearance can be easily extended out, which meets requirements of users to wear on their faces.

The first skirt portion 26 may wrap the first lens 20 by over-molding; alternatively, the first skirt portion 26 may be formed first, and then the first skirt portion 26 is assembled with the first lens 20. Since the first retaining wall 22 defines the first visible area 205 coated with the first anti-fog layer 24, the first connection area 207 at the outer side of the first retaining wall 22 will not be contaminated with the anti-fog agent, which will not affect the over-molding or assembling of the first skirt portion 26. Similarly, the second skirt portion 27 may wrap the second lens 21 by over-molding; alternatively, the second skirt portion 27 may be formed first, and then the second skirt portion 27 is assembled with the second lens 21. Since the second retaining wall 23 defines the second visible area 215 coated with the second anti-fog layer, the second connection area 217 at the outer side of the second retaining wall 23 will not be contaminated with the anti-fog agent, which will not affect the over-molding or assembling of the second skirt portion 27.

The first connection area 207 of the first lens 20 is fixed in the first frame portion 28, and the second connection area 217 of the second lens 21 is fixed in the second frame portion 29. However, in this embodiment, as mentioned above, the first connection area 207 of the first lens 20 is first completely wrapped within the first wrapping part 261 of the first skirt portion 26, and then assembled and fixed in the first frame portion 28 (which can be known by referring to FIG. 1 and FIG. 2 together, and thus will not be particularly depicted in other figures). The second connection area 217 of the second lens 21 is first completely wrapped within the second wrapping part 271 of the second skirt portion 27, and then assembled and fixed in the second frame portion 29 (which can be known by referring to FIG. 1 and FIG. 2 together, and thus will not be particularly depicted in other figures). In actual assembling, the first frame portion 28 and the second frame portion 29 may be made by injection molding, and in this embodiment, the first frame portion 28 and the second frame portion 29 are integrally formed and connected to each other. A first buckle 281 and a second buckle 291 are respectively provided on the right side of the first frame portion 28 and the left side of the second frame portion 29 and are adapted to be connected to the elastic band 3. It shall be appreciated that, the shape and structure of the elastic band of the present invention are not limited to the form shown in this embodiment, and since the elastic band is not the focus of the present invention, it will not be further described herein.

Therefore, the first frame portion 28 and the second frame portion 29, which are integrally formed and connected to each other, correspond to the right and left sides when worn by the user. The first lens 20 and the first retaining wall 22 formed integrally are wrapped by the first skirt portion 26 and then fixed to the first frame portion 28, and are adapted to fit the right eye of the user. The second lens 21 and the second retaining wall 23 formed integrally are wrapped by the second skirt portion 27 and then fixed to the second frame portion 29, and are adapted to fit the left eye of the user. In this way, the elements on the right and left sides can be respectively attached and fixed to fit the right and left eyes of the user respectively. Not only are the first frame portion 28 and the second frame portion 29 integrally formed and connected to each other, in other embodiments, the first skirt portion 26 and the second skirt portion 27 may also be integrally formed to meet different use requirements or appearance designs.

It shall be particularly appreciated that, how the first skirt portion 26 is arranged on the first retaining wall 22 along the first configuration of the first retaining wall 22, how the second skirt portion 27 is arranged on the second retaining wall 23 along the second configuration of the second retaining wall 23, how the first skirt portion 26 wraps the first connection area 207 of the first lens 20, how the second skirt portion 27 wraps the second connection area 217 of the second lens 21 are not limited by the present invention. Moreover, how the first connection area 207 of the first lens 20 is assembled and fixed to the first frame portion 28, how the second connection area 217 of the second lens 21 is assembled and fixed to the second frame portion 29, whether the first connection area 207 of the first lens 20 is over-molded with the first frame portion 28 or whether the second connection area 217 of the second lens 21 is over-molded with the second frame portion 29 are also not limited by the present invention. For example, as shown in FIG. 5A. FIG. 5B and FIG. 5C, taking the first lens 20, the first retaining wall 22, the first anti-fog layer 24, and the first skirt portion 26 as examples, the first wrapping part 261 of the first skirt portion 26 of the present invention can contact with the first retaining wall 22 in different ways when wrapping the first retaining wall 22, including but not limited to the following cases: the first wrapping part 261 shown in FIG. 5A only wraps the outer side of the first retaining wall 22, completely wraps the first connection area 207 of the first lens 20 and encloses the first visible area 205 of the first lens 20; the first wrapping part 261 shown in FIG. 5B completely wraps the inner and outer sides of the first retaining wall 22, completely wraps the first connection area 207 of the first lens 20 and encloses the visible area 215; and the first wrapping part 261 shown in FIG. 5C is arranged along the inner side of the first retaining wall 22, does not wrap the first connection area 207 of the first lens 20 at all and encloses the first visible area 205 (in this aspect, the first connection area 207 of the first lens 20 is assembled and fixed in the first frame portion 28 or over-molded with the first frame portion 28); and other such implementations. That is, the first skirt portion 26 may be disposed on the first retaining wall 22 along the first configuration of the first retaining wall 22 in the form of partially or completely wrapping the first retaining wall 22, for example, the first wrapping part 261 of the first skirt portion 26 wraps the outer side of the first retaining wall 22 or is arranged along the inner side of the first retaining wall 22. The second skirt portion 27 may be disposed on the second retaining wall 23 along the second configuration of the second retaining wall 23 in the form of partially or completely wrapping the second retaining wall 23, for example, the second wrapping part 271 of the second skirt portion 27 wraps the outer side of the second retaining wall 23 or is arranged along the inner side of the second retaining wall 23. The first skirt portion 26 and the first connection area 207 of the first lens 20 as well as the second skirt portion 27 and the second connection area 217 of the second lens 21 may be combined in the form of complete wrapping, partial wrapping, or no wrapping. In addition, in the aforesaid embodiments, the first connection area 207 of the first lens 20 is assembled and fixed to the first frame portion 28, and the second connection area 217 of the second lens 21 is assembled and fixed to the second frame portion 29. However, in other embodiments, the first connection area 207 of the first lens 20 may also be over-molded with the first frame portion 28, and the second connection area 217 of the second lens 21 may also be over-molded with the second frame portion 29.

Figure 6:
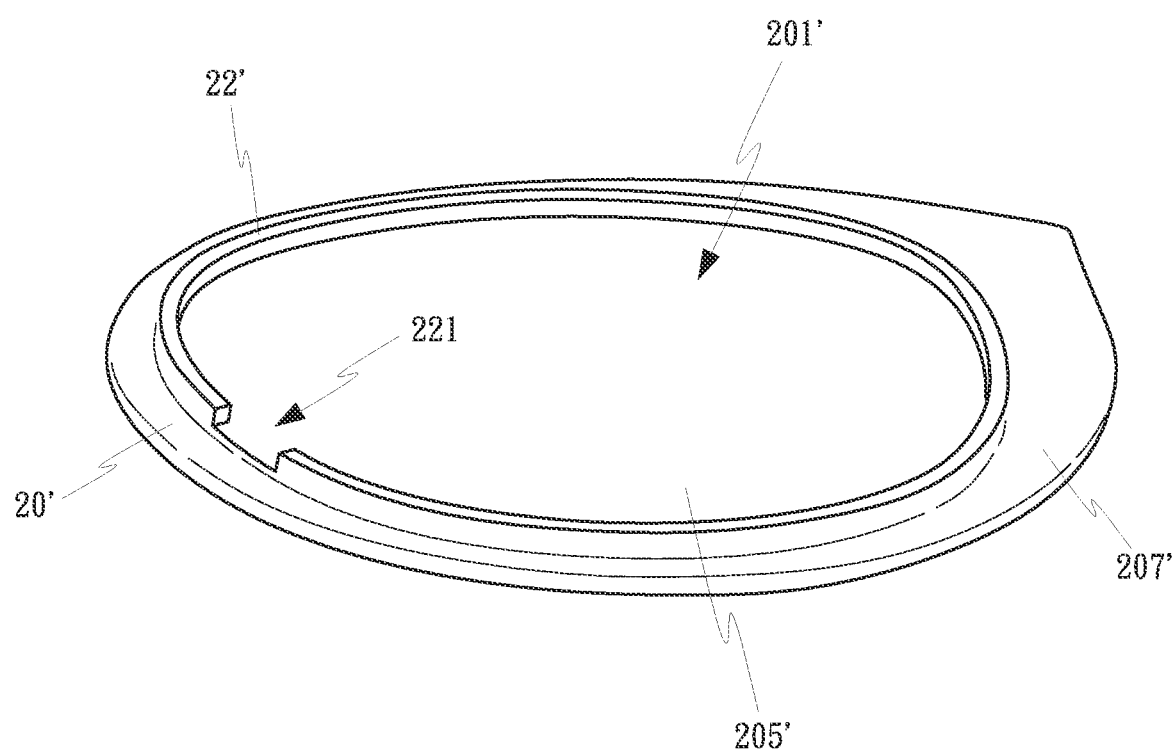
FIG. 6 is a schematic perspective view of the retaining wall disposed on the lens in another implementation according to the present invention.

The lens assembly structure of the second embodiment of the present invention is also applied to swimming goggles, and structures of elements thereof are generally the same as those of the first embodiment, and thus will not be further described herein. The main difference from the previous embodiment is that the configuration of the retaining wall of the lens assembly structure of this embodiment is a non-continuous curve. As shown in FIG. 6, a lens 20' and a retaining wall 22' on one side of the lens assembly structure are taken as examples for illustration. In this embodiment, the retaining wall 22' protrudes from and is disposed on an eye side 201' of the lens 20', and it also defines a visible area 205' and a connection area 207' on the lens 20', and the connection area 207' is located at the periphery of the visible area 205'. The configuration of the retaining wall 22' is a non-continuous curve and has a contour less complicated than the peripheral configuration of the lens 20'. In this embodiment, as shown in the figure, the configuration of the retaining wall 22' is a non-continuous curve with a notch 221, while in other implementations of this embodiment, the configuration of the retaining wall 22' may be (but not limited to) a simple curve with one or more notches and without much bending or strong curvature change, such as egg-shaped, elliptic and circular curves.

According to the above descriptions, for the swimming goggles with the lens assembly structure of the present invention, the eye mask (i.e., the skirt portion defined by the present invention) can be formed by extending from the retaining wall with an appropriate size and simple configuration no matter lenses with simple shapes or lenses with complicated shapes having multiple twists on the periphery are used. In this way, the eye mask can also have the size and shape required by the design, improve the process efficiency, and can be comfortably worn on the head of the user according to the needs of the user, without being affected by the lenses with various configurations. On the other hand, with the setting of the retaining wall, the visible area of the user can be defined on the lens, so the process of coating the anti-fog agent and the use of materials can be more convenient, simple, and accurate and thus save the material consumption.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A lens assembly structure of swimming goggles, comprising:
    a first lens, including a first eye side and a first water side;
    a second lens, including a second eye side and a second water side;
    a first retaining wall, being integrally formed on and protruding from the first eye side of the first lens, the first retaining wall defining a first visible area and a first connection area of the first lens, the first retaining wall having a first continuous closed curve contour enclosing the entire first visible area of the first lens, the first continuous closed curve contour being less complicated than a peripheral configuration of the first lens;
    a second retaining wall, being integrally formed on and protruding from the second eye side of the second lens, the second retaining wall defining a second visible area and a second connection area of the second lens, the second retaining wall having a second continuous closed curve contour enclosing the entire second visible area of the second lens, the second continuous closed curve contour being less complicated than a peripheral configuration of the second lens;
    a first skirt portion, being disposed on the first retaining wall along the first, continuous closed curve contour and having a first wrapping part completely wrapping the first connection area of the first lens;
    a second skirt portion, being disposed on the second retaining wall along the second continuous closed curve contour and having a second wrapping part completely wrapping the second connection area of the second lens;
    a first frame portion, the first connection area of the first lens being affixed in the first frame portion; and
    a second frame portion, the second connection area of the second lens being affixed in the second frame portion;
    wherein the first connection area is coplanar with the first visible area, and the second connection area is coplanar with the second visible area;
    wherein the first connection area is an area completely surrounding a portion of the first lens, and the second connection area is an area completely surrounding a portion of the second lens.

2. The lens assembly structure as claimed in claim 1, wherein the first skirt portion further comprises a first fitting part, the first wrapping part further wraps at least one part of the first retaining wall and encloses the first visible area, the first fitting part is configured to tightly fit a face of a user, the second skirt portion further comprises a second fitting part, the second wrapping part further wraps at least one part of the second retaining wall and encloses the second visible area, and the second fitting part is configured to tightly fit the face of the user.

3. The lens assembly structure as claimed in claim 2, further comprising a first anti-fog layer, disposed on the first visible area, and a second anti-fog layer, disposed on the second visible area.

4. The lens assembly structure as claimed in claim 3, wherein the first retaining wall has a height between 0.1 to 5 millimeters (mm), and the second retaining wall has a height between 0.1 to 5 millimeters (mm).

5. The lens assembly structure as claimed in claim 4, wherein the first retaining wall has a width between 0.3 to 5 millimeters (mm), and the second retaining wall has a width between 0.3 to 5 millimeters (mm).

6. The lens assembly structure as claimed in claim 5, wherein the first frame portion and the second frame portion are integrally formed.

7. The lens assembly structure as claimed in claim 2, wherein the first wrapping part wraps an outer side of the first retaining wall, and the second wrapping part wraps an outer side of the second retaining wall.

8. The lens assembly structure as claimed in claim 2, wherein the first wrapping part further wraps an inner side of the first retaining wall, and the second wrapping part further wraps an inner side of the second retaining wall.

9. The lens assembly structure as claimed in claim 1, wherein the first wrapping part wraps an outer side of the first retaining wall, and the second wrapping part wraps an outer side of the second retaining wall.

10. The lens assembly structure as claimed in claim 1, wherein the first wrapping part wraps an inner side of the first retaining wall, and the second wrapping part wraps an inner side of the second retaining wall.

11. A lens assembly structure of swimming goggles, comprising:
- a first lens, including a first eye side and a first water side;
- a second lens, including a second eye side and a second water side;
- a first retaining wall protruding from the first eye side of the first lens, the first retaining wall defining a first visible area and a first connection area of the first lens, the first retaining wall having a first continuous closed curve contour enclosing the entire first visible area of the first lens, the first continuous closed curve contour being less complicated than a peripheral configuration of the first lens;
- a second retaining wall protruding from the second eye side of the second lens, the second retaining wall defining a second visible area and a second connection area of the second lens, the second retaining wall having a second continuous closed curve contour enclosing the entire second visible area of the second lens, the second continuous closed curve contour being less complicated than a peripheral configuration of the second lens;
- a first skirt portion, being disposed on the first retaining wall along the first continuous closed curve contour and having a first wrapping part completely wrapping the first connection area of the first lens;
- a second skirt portion, being disposed on the second retaining wall along the second continuous closed curve contour and having a second wrapping part completely wrapping the second connection area of the second lens;
- a first frame portion, the first connection area of the first lens being affixed in the first frame portion; and
- a second frame portion, the second connection area of the second lens being affixed in the second frame portion;
- wherein the first connection area is coplanar with the first visible area, and the second connection area is coplanar with the second visible area;
- wherein the first connection area is an area completely surrounding a portion of the first lens, and the second connection area is an area completely surrounding a portion of the second lens;
- wherein the first retaining wall protrudes from and is provided on the first eye side of the first lens by glue or ultrasonic welding, and the second retaining wall protrudes from and is provided on the second eye side of the second lens by glue or ultrasonic welding.

12. The lens assembly structure as claimed in claim 11, further comprising a first anti-fog layer, disposed on the first visible area, and a second anti-fog layer, disposed on the second visible area.

13. The lens assembly structure as claimed in claim 12, wherein the first retaining wall has a height between 0.1 to 5 millimeters (mm), the second retaining wall has a height between 0.1 to 5 millimeters (mm), the first retaining wall has a width between 0.3 to 5 millimeters (mm), and the second retaining wall has a width between 0.3 to 5 millimeters (mm).

14. The lens assembly structure as claimed in claim 13, wherein the first frame portion and the second frame portion are integrally formed.

* * * * *